United States Patent
Yen et al.

(10) Patent No.: US 8,294,810 B2
(45) Date of Patent: Oct. 23, 2012

(54) ASSISTING FOCUSING METHOD FOR FACE BLOCK

(75) Inventors: Chih-Pin Yen, Taipei County (TW); Chia-Lun Tsai, Changhua County (TW); Li-Wen Kuo, Taichung County (TW)

(73) Assignee: Altek Corporation, Hsinchu (TW)

( * ) Notice: Subject to any disclaimer, the term of this patent is extended or adjusted under 35 U.S.C. 154(b) by 283 days.

(21) Appl. No.: 12/833,377

(22) Filed: Jul. 9, 2010

(65) Prior Publication Data

US 2012/0008038 A1    Jan. 12, 2012

(51) Int. Cl.
*H04N 5/232* (2006.01)
(52) U.S. Cl. .......................................... 348/349
(58) Field of Classification Search ................... 348/349
See application file for complete search history.

(56) References Cited

U.S. PATENT DOCUMENTS

| | | | |
|---|---|---|---|
| 7,733,412 B2 * | 6/2010 | Takayama | 348/349 |
| 8,068,164 B2 * | 11/2011 | Kumagai et al. | 348/345 |
| 8,106,999 B2 * | 1/2012 | Izawa | 348/349 |
| 2009/0095880 A1 * | 4/2009 | Otsuki | 250/201.2 |
| 2010/0201864 A1 * | 8/2010 | Takayama | 348/349 |

* cited by examiner

*Primary Examiner* — James Hannett
(74) *Attorney, Agent, or Firm* — Morris Manning & Martin LLP; Tim Tingkang Xia, Esq.

(57) ABSTRACT

An assisting focusing method is applicable in an image capture device having an auto focusing (AF) procedure. The AF procedure has a preset sampling interval. The assisting focusing method includes the following steps. An image for focusing is captured. A face parameter of a face block in the image for focusing is calculated. According to the face parameter, a parameter-to-focus conversion table is looked up to acquire a focusing section. According to the focusing section and a face sampling interval, the AF procedure is performed to acquire a target focus. The face sampling interval is smaller than the preset sampling interval.

8 Claims, 5 Drawing Sheets

ASSISTING FOCUSING METHOD FOR FACE BLOCK

BACKGROUND OF THE INVENTION

1. Field of Invention

The present invention relates to an assisting focusing method, and more particularly to an assisting focusing method for a face block.

2. Related Art

Auto focusing (AF) technology substantially includes active auto focus and the other is passive auto focus. In the active auto focus technology, a set of infrared emitters or laser emitters and corresponding receivers are used to project patterns of light on a photographed object and then a distance between a camera and the photographed object is calculated through a method such as triangulation, in which the distance is a focus. However, due to poor precision, the active auto focus cannot be applied in a situation that the image capture device and the photographed object are separated by an object such as glass. Furthermore, when using the active auto focus, additional light emitters and receivers need to be disposed in the camera, so that the cost is high.

In the passive auto focus, before practical photographing, many images are captured from micro focus to a region set to be infinite far and clarifies of the captured images are analyzed to determine the focus. In the passive auto focus method, only an image sensor and a calculating unit of the camera itself need to be used, so that manufacturing cost is reduced. However, due to a large amount of calculation, precision is usually sacrificed in the passive auto focus to avoid spending too much time on AF.

In recent years, in addition to professional photographers, more and more common users use digital cameras to photograph. Generally, images photographed by the common users usually have problems of being not in focus as a result of lacking photographing skills compared with professional photographers. However, when a picture is photographed, a human image is usually an important part in a picture. In a conventional AF method, a problem that a background or other objects instead of human might be determined as photographing subjects but the human that should be the photographing emphasis are defocused. Furthermore, once the precision of the AF is insufficient, and a focusing error occurs, the photographed image may be seriously blurred. Especially, when the photographed image is a human image, photographing defects that occur on the face seem even worse.

SUMMARY OF THE INVENTION

In one aspect, the present invention relates to an assisting focusing method for a face block, which is applicable to an image capture device having an auto focusing (AF) procedure. The AF procedure has a preset sampling interval. The assisting focusing method for the face block comprises the following steps. An image for focusing is captured, in which the image for focusing has a face block. A face parameter of the face block in the image for focusing is calculated. According to the face parameter, a parameter-to-focus conversion table is looked up to acquire a focusing section. According to the focusing section and a face sampling interval, the AF procedure is performed to acquire a target focus. The face sampling interval is smaller than the preset sampling interval.

According to an embodiment of the present invention, the looking up the parameter-to-focus conversion table to acquire the focusing section according to the face parameter comprises the following steps. According to the face parameter, the parameter-to-focus conversion table is looked up to acquire a predictive focusing position corresponding to the face parameter. According a scaling ratio of the image capture device, the focusing section is acquired with the predictive focusing position as a reference point. After the focusing section is acquired, in the AF procedure the target focus is calculated through quadratic polynomial approximation.

In conclusion, in the assisting focusing method for the face block, the parameter-to-focus conversion table is looked up according to the face parameter of the face block and the AF procedure is performed in the acquired focusing section with high precision. Therefore, the precision of the AF is increased to obtain a better target focus, so as to photograph a clear face image.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention relates to an assisting focusing method for a face block applicable to an image capture device having an auto focusing (AF) procedure. The AF procedure has a preset sampling interval.

Figure 1:
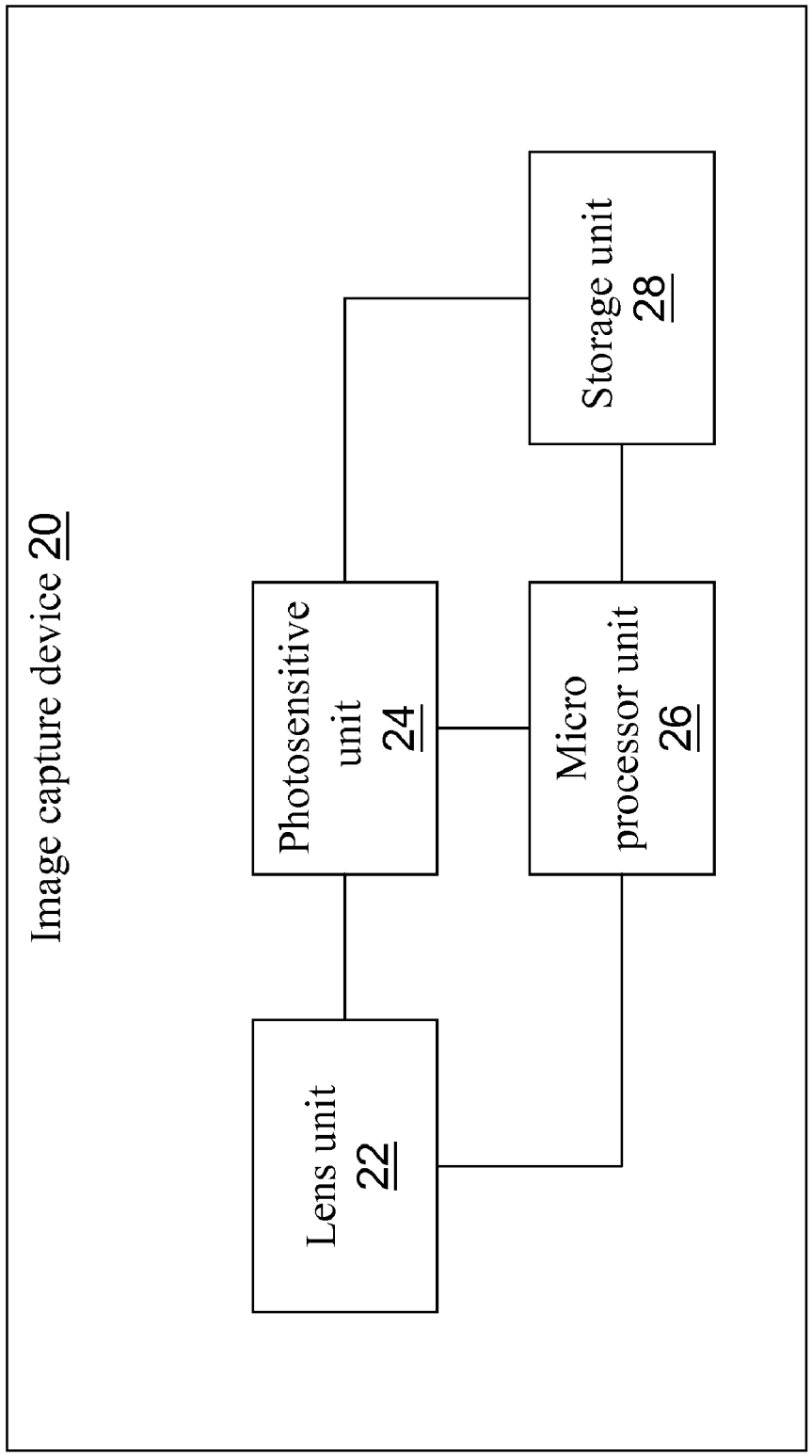
FIG. 1 is a schematic block diagram of an image capture device according to an embodiment of the present invention.

FIG. 1 is a schematic block diagram of an image capture device according to an embodiment of the present invention. However, the image capture device to which the assisting focusing method for the face block according to the present invention is applicable is not limited to FIG. 1.

The image capture device 20 may be, for example, a digital camera, or a camera, a video camera or a webcam having a photographing function. The image capture device 20 comprises a lens unit 22, a photosensitive unit 24, a micro processor unit 26, and a storage unit 28. When an image is captured, the image capture device 20 focuses the lens unit 22 at a focusing distance (also referred to as a focus). When a user photographs an image, the micro processor unit 26 controls the lens unit 22 to a focusing position corresponding to the focusing distance and stores the image obtained with the lens unit 22 and the photosensitive unit 24 in the storage unit 28.

The focusing distance refers to a distance from an optical center of the lens unit 22 to a photographed object or human and a unit for the length may be meter or centimeter. The focusing position is also referred to as a focus length, which means a distance from the optical center of the lens unit 22 to the photosensitive unit 24. The image capture device 20 controls the lens device 22 to different focusing positions by using a step motor (not shown). A step (also referred to as a step distance) is usually used as a unit for the focusing position.

It should be noted that a relation between the focusing distance and the focusing position is not necessarily proportional. For example, the number of steps corresponding to the focusing distance of 1 meter is not necessarily twice as much as that corresponding to the focusing distance of half a meter and the number of steps corresponding to the focusing distance of 2 meters is not necessarily twice as much as that corresponding to the focusing distance of 1 meter.

Figure 2:
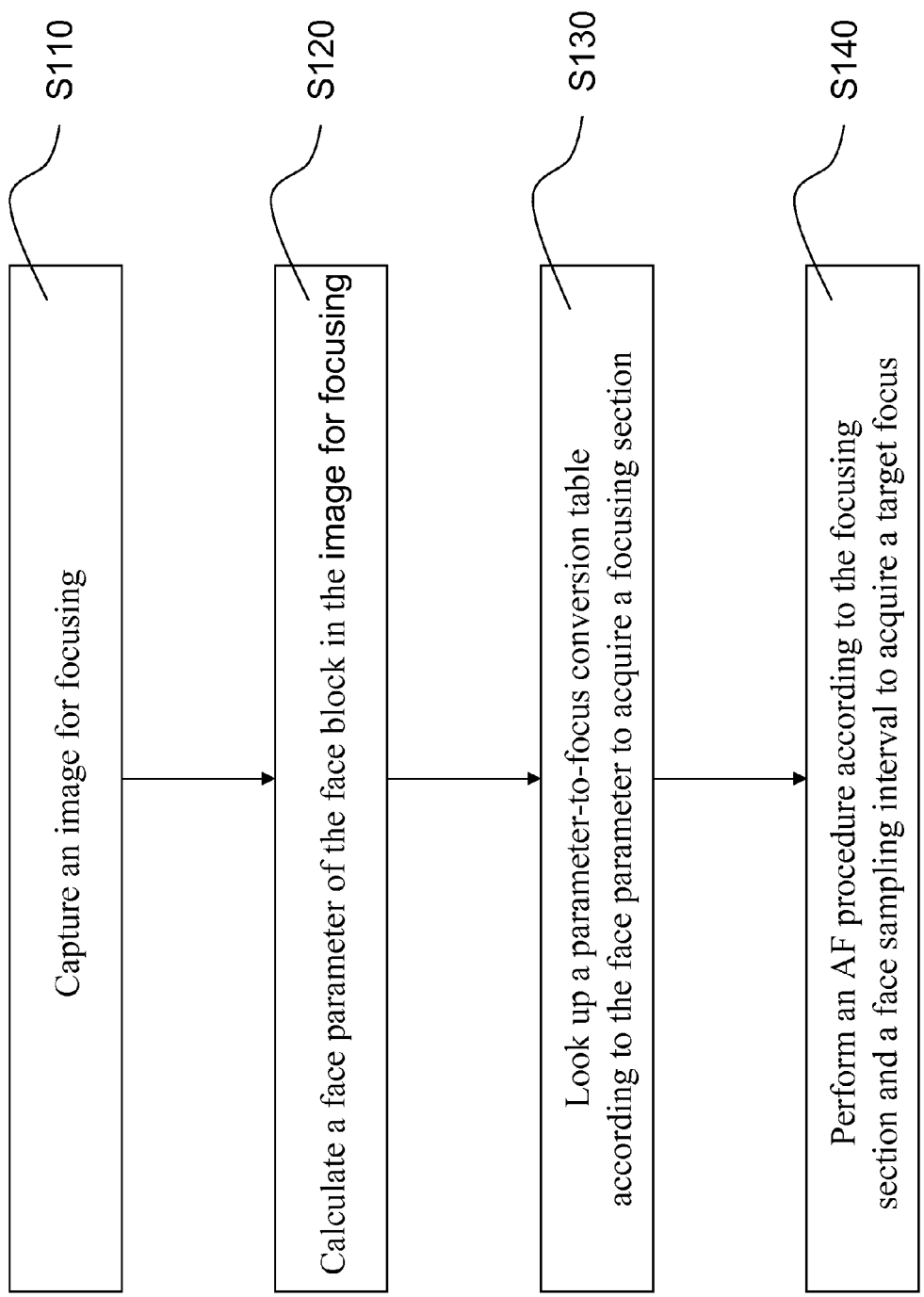
FIG. 2 is a flow chart of an assisting focusing method for a face block according to an embodiment of the present invention.
Figure 3B:
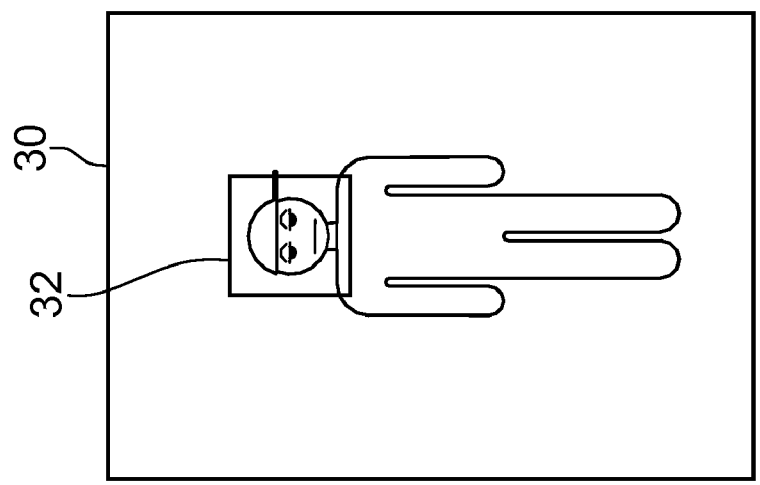
FIG. 3B is a schematic view of a face block according to another embodiment of the present invention.
Figure 3A:
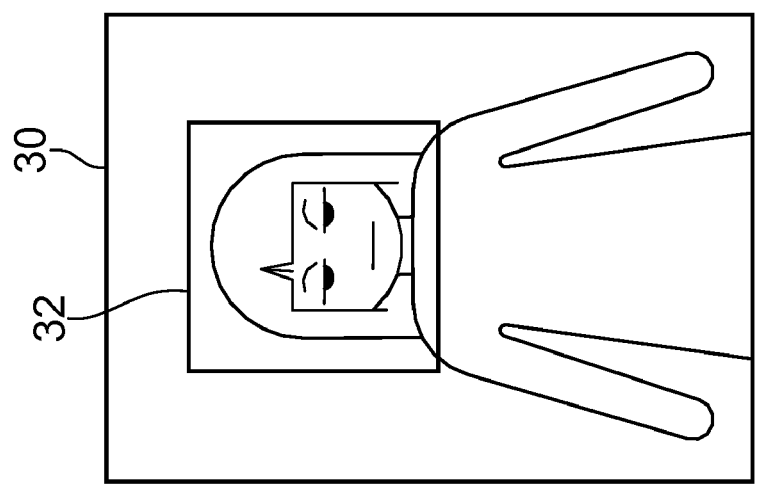
FIG. 3A is a schematic view of a face block according to an embodiment of the present invention.

Referring to FIGS. 2, 3A, and 3B at the same time, FIG. 2 is a flow chart of an assisting focusing method for a face block according to an embodiment of the present invention and FIGS. 3A and 3B are schematic views of a face block according to different embodiments.

First, the image capture device 20 captures an image for focusing 30 (Step S110). The image for focusing 30 has a face block 32. The face block 32 means an image of a human face portion in the image for focusing 30 after the face of the photographed human is captured into the image for focusing 30. The micro processor unit 26 of the image capture device 20 performs a face detection procedure to detect the face block 32 in the image for focusing 30.

The image capture device 20 usually uses the AF procedure to move the lens unit 22 to different focusing positions in sequence according to the preset sampling interval for the AF. However, when the face block 32 is detected in the image for focusing 30, it represents that the user wants to photograph at least one human. In the assisting focusing method for the face block, the precision of the AF procedure can be increased for the photographed human and a target focus is obtained through the following steps, so as to obtain a better human image compared with photographing the photographed human with the target focus.

After the face block 32 is obtained, the micro processor unit 26 calculates a face parameter of the face block 32 in the image for focusing 30 (Step S120). The face parameter may be a length ratio or an area ratio between the face block 32 and the whole image for focusing 30. For example, it is assumed that a resolution of the image for focusing 30 is 640*480 and a resolution of the face block 32 detected by the face detection procedure is 120*80. Thus, the face parameter may be $$\frac{120}{640} = \frac{3}{16}, \frac{80}{480} = \frac{1}{6} \text{ or } \frac{120*80}{640*480} = \frac{3}{96}.$$

As the face parameter adopts a ratio value between the face block 32 and the image for focusing 30 instead of an absolute value, the assisting focusing method for the face block is applicable to different image formats and various image capture devices 20.

Next, the micro processor unit 26 looks up a parameter-to-focus conversion table according to the face parameter to acquire a focusing section (Step S130). The focusing section is a range of a potential focusing position when the image of the photographed human is captured, so that the AF procedure should be performed in the focusing section with high focusing precision.

The parameter-to-focus conversion table is corresponding to the face detection procedure. Because even a same image for focusing 30 is processed, face blocks 32 of difference size or at different positions may be found out through different face detection procedures. Therefore, the parameter-to-focus conversion table can be designed in coordination with the face detection procedure.

As shown in FIGS. 3A and 3B, generally speaking, a photographed human closer to the image capture device 20 forms a larger face block 32 in the image for focusing 30 and a photographed human farther away from the image capture device 20 forms a smaller face block 32 in the image for focusing 30.

The step of looking up the parameter-to-focus conversion table according to the face parameter to acquire the focusing section comprises the following steps. According to the face parameter, the parameter-to-focus conversion table is looked up to acquire a predictive focusing position corresponding to the face parameter. According to a scaling ratio of the image capture device 20, the focusing section is obtained with the predictive focusing position as a reference point.

The scaling ratio is a zoom ratio set for the image capture device 20 when the image for focusing 30 is captured, which also corresponds to the focus length. For example, when the lens unit 22 of the image capture device 20 is zoomed from a focus length of 37 mm to a focus length of 260 mm, the scaling ratio is between 37 mm to 260 mm. The lens unit 22 having a zoom function can adjust a position of a lens in the lens unit 22 before photographing, so as to change the focus length. An end of the shortest focus length (37 mm) is referred to as a wide end so that the image capture device 20 can capture an image in a wide range. On the contrary, an end of the longest focus length (260 mm) is referred to as a tele end, at which a distant scene image seems to be drawn close to the image capture device 20 visually, thus realizing an effect of enlarging the image.

The scaling ratio impacts the preset sampling interval. For example, when the scaling ratio is set to be close to the wide end, the preset sampling interval may be 20 steps, and when the scaling ratio is set to be close to the tele end, the preset sampling interval may be 30 steps. The image capture device 20 can obtain the focusing section with the predictive focusing position as the reference point according to the scaling ratio when the image for focusing 30 is captured, that is, obtain a range of most possible focusing positions when the image of the photographed human is captured.

Figure 4C:
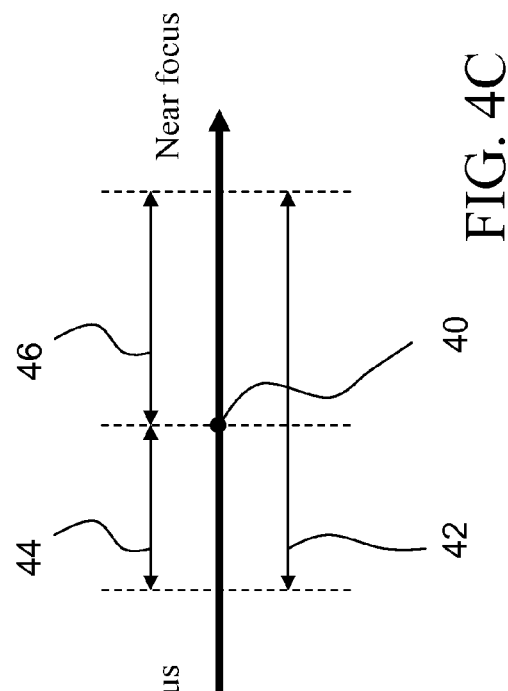
FIG. 4C is a schematic view of a focusing section according to a further embodiment of the present invention.
Figure 4A:
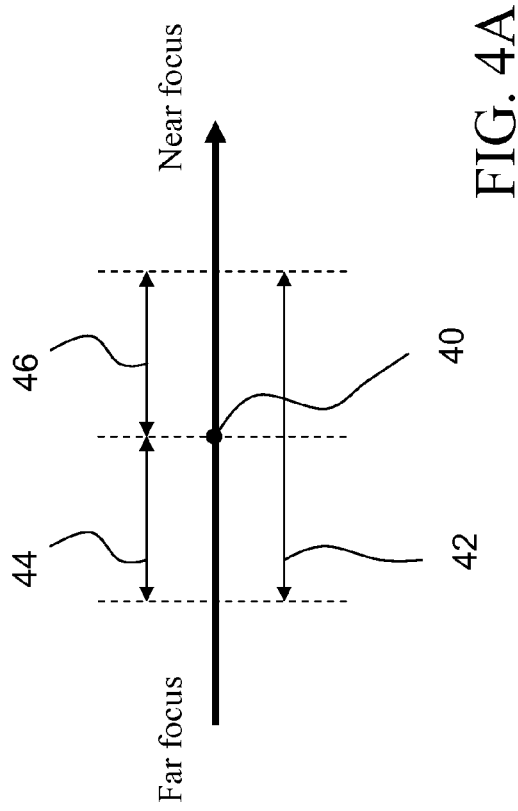
FIG. 4A is a schematic view of a focusing section according to an embodiment of the present invention.
Figure 4B:
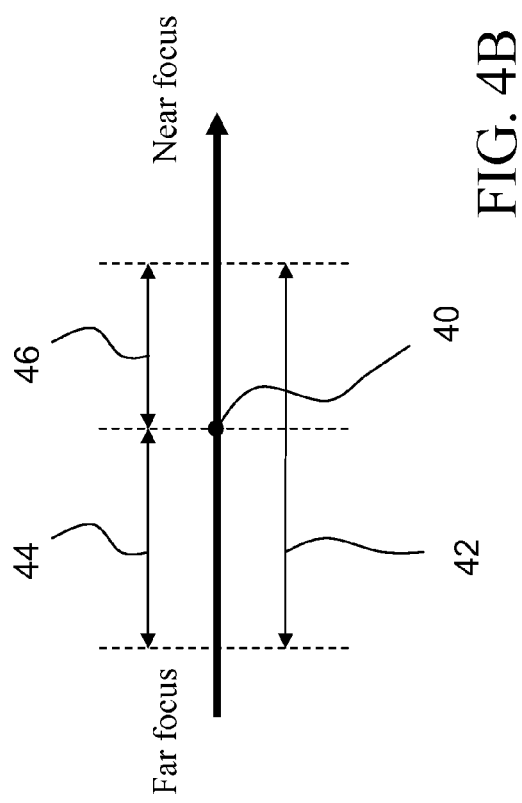
FIG. 4B is a schematic view of a focusing section according to another embodiment of the present invention.

Referring to FIGS. 4A, 4B, and 4C, FIGS. 4A, 4B, and 4C are schematic views of a focusing section according to difference embodiments of the present invention.

In Step S130, the focusing section 42 is obtained through the predictive focusing position 40 and the focusing section 42 has a front section 44 and a back section 46. The front section 44 is located between the predictive focusing position 40 and a near focus of the image capture device 20. The back section 46 is located between the predictive focusing position 40 and a far focus of the image capture device 20. A focus length of the near focus is long (for example, 200 steps) and a focus length of the far focus is short (for example, 100 steps). Also, different scaling ratios are corresponding to different near focus and far focus.

According to the present invention, a length of the front section 44 may be the same as that of the back section 46 or the length of the front section 44 may be greater than or smaller than that of the back section 46.

Hereinafter, practical data is taken as an example to describe the present invention. However, the assisting focusing method for the face block according to the present invention is not limited to the data in the examples.

When the image for focusing 30 is captured, the scaling ratio of the image capture device 20 is closer to the wide end, representing that a photographed human at a far position is to be focused. It is assumed that at this time the preset sampling interval is 20 steps and the predictive focusing position 40 obtained by looking up the table is a 150th step. Thus, a range between 10 steps towards the far focus of the current scaling ratio from the predictive focusing position 40, and 20 steps towards the near focus from the predictive focusing position 40 is assigned as the focusing section 42. Therefore, the focusing section 42 is a range between a 140th step and a 170th step.

Furthermore, for example, when the image capture device 20 captures the image for focusing 30, the scaling ratio is closer to the tele end and the preset sampling interval is 30 steps. Thus, a range between 30 steps towards the far focus of the current scaling ratio from the 150th step of the predictive focusing position 40, and 15 steps towards the near focus from the predictive focusing position 40 is assigned as the focusing section 42. Therefore, the focusing section 42 is a range between a 120th step and a 165th step.

However, according to another embodiment of the present invention, the predictive focusing section corresponding to the face parameter instead of the predictive focusing position 40 corresponding to the face parameter is recorded in the parameter-to-focus conversion table. The image capture device 20 can also obtain the focusing section 42 according to the scaling ratio and the predictive focusing section through the steps above.

After the focusing section 42 is obtained, the micro processor unit 26 performs the AF procedure according to the focusing section 42 and a face sampling interval to acquire the target focus (Step S140). The face sampling interval is smaller than the preset sampling interval, that is, the micro processor unit 26 performs the AF procedure with an AF precision higher than a preset value in the focusing section 42. The face sampling focus is also related to the scaling ratio. For example, when the scaling ratio is close to the wide end, the face sampling interval may be 4 steps, and when the scaling ratio is close to the tele end, the face sampling interval may be 6 steps.

According to the examples of the practical data, the AF procedure can be performed with a sampling interval of 4 steps in the focusing section 42 from the 140th step to the 170th step. Alternatively, the AF procedure can be performed with a sample interval of 6 steps in the focusing section 42 from the 120th step to the 165th step.

After the focusing section 42 is obtained, in the AF procedure the target focus can be calculated through quadratic polynomial approximation.

Figure 5:
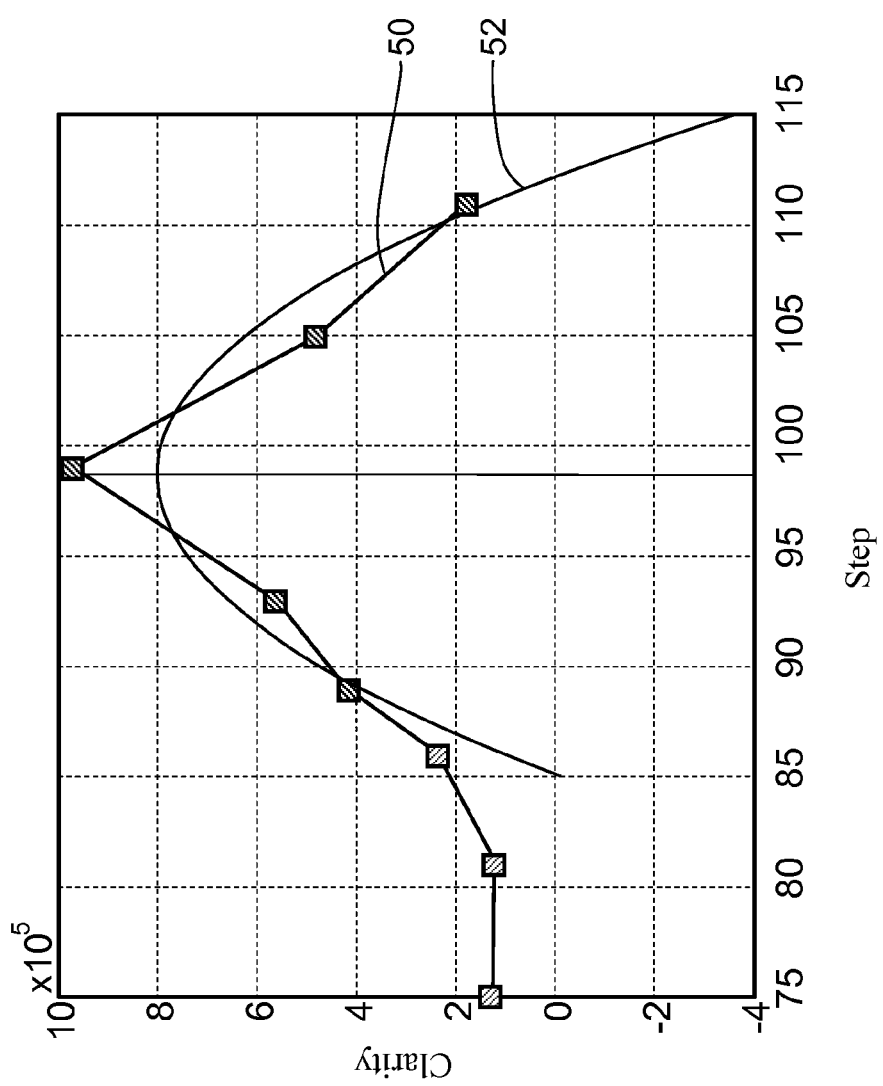
FIG. 5 is a schematic view of a clarity curve according to an embodiment of the present invention.

FIG. 5 is a schematic view of a clarity curve according to an embodiment of the present invention.

The quadratic polynomial approximation can also be referred to as quadratic polynomial curve fitting method. In the AF procedure, images at multiple focusing positions in the focusing section 42 are captured respectively and clarities of the images are calculated. Next, focusing distances and corresponding clarities in the focusing section 42 are plotted as an X axis and a Y axis, so as to acquire a clarity curve 50. Then, according to the clarity curve 50, the quadratic polynomial curve fitting is performed to acquire a quadratic polynomial fitted curve 52, and a focusing position corresponding to a peak of the quadratic polynomial fitted curve 52 is calculated as the target focus.

Particularly, in the AF procedure, an image is captured for every face sampling interval in the focusing section 42 to calculate the clarity. The calculation method of the face sampling interval may be dividing the focusing section 42 by a number of sampling points. Thus, in a same focusing section 42, the larger number of sample points represents a smaller face sampling interval and higher AF precision.

For example, when the face block 32 is not detected in the image for focusing 30, in the AF procedure, 10 sampling points are taken in the range from the micro focus to the infinite far to perform AF. When the face block 32 is detected in the image for focusing 30, also 10 sampling points are taken in the focusing section 42 to perform the AF. Thus, although the same time is taken to perform the quadratic polynomial approximation with 10 images, a more accurate target focus is obtained, so that focusing errors can be avoided.

The parameter-to-focus conversion table can be established by through an experimental method. The establishment through the experimental method means that photographed human corresponding to various face parameters are photographed with different focuses and the predictive focusing positions 40 corresponding to each face parameter is calculated, so as to establish the parameter-to-focus conversion table.

Additionally, in the previous embodiments, the image for focusing 30 having a single face block 32 is taken as an example. However, the assisting focusing method for the face block is also applicable to the image for focusing 30 having multiple face blocks 32. For example, a mean, a median or a mode of all the face parameters can be looked up; or multiple face parameters can be looked up to acquire multiple predictive focusing positions 40 and then a mean, a median or a mode of the multiple predictive focusing positions 40 is taken as the final predictive focusing position 40.

In conclusion, in the assisting focusing method for the face block of the present invention, the parameter-to-focus conversion table is looked up according to the face parameter of the face block and the AF procedure is performed with high precision in the acquired focusing section. As additional hardware such as a light emitter and a light receiver does not need to be disposed within the image capture device, the fabrication cost is low. Moreover, the target focus more accurate compared with the prior art can be obtained by increasing the AF precision, so that the user is able to photograph a clear face image.

What is claimed is:

1. An assisting focusing method for a face block, applicable to an image capture device having an auto focusing (AF) procedure, wherein the AF procedure has a preset sampling interval, the assisting focusing method for the face block comprising:

capturing an image for focusing, wherein the image for focusing has a face block;

calculating a face parameter of the face block in the image for focusing;

looking up a parameter-to-focus conversion table according to the face parameter, and acquiring a predictive focusing position corresponding to the face parameter;

acquiring a focusing section with the predictive focusing position as a reference point according to a scaling ratio of the image capture device; and performing the AF procedure according to the focusing section and a face sampling interval to acquire a target focus, wherein the face sampling interval is smaller than the preset sampling interval.

2. The assisting focusing method for the face block according to claim 1, wherein the face parameter is a length ratio between the face block and the image for focusing.

3. The assisting focusing method for the face block according to claim 1, wherein the face parameter is an area ratio between the face block and the image for focusing.

4. The assisting focusing method for the face block according to claim 1, wherein the parameter-to-focus conversion table is corresponding to a face detection procedure and the image capture device detects the face block in the image for focusing by using the face detection procedure.

5. The assisting focusing method for the face block according to claim 1, wherein the focusing section has a front section and a back section, the front section is located between the predictive focusing position and a near focus of the image capture device, the back section is located between the predictive focusing position and a far focus of the image capture device, and a length of the front section is the same as that of the back section.

6. The assisting focusing method for the face block according to claim 1, wherein the focusing section has a front section and a back section, the front section is located between the predictive focusing position and a near focus of the image capture device, the back section is located between the predictive focusing position and a far focus of the image capture device, and a length of the front section is greater than that of the back section.

7. The assisting focusing method for the face block according to claim 1, wherein the focusing section has a front section and a back section, the front section is located between the predictive focusing position and a near focus of the image capture device, the back section is located between the predictive focusing position and a far focus of the image capture device, and a length of the front section is smaller than that of the back section.

8. The assisting focusing method for the face block according to claim 1, wherein the target focus is calculated through quadratic polynomial approximation in the AF procedure.

* * * * *